United States Patent
Saifullah et al.

(10) Patent No.: US 8,175,024 B2
(45) Date of Patent: May 8, 2012

(54) BANDWIDTH ALLOCATION FOR RELAY NETWORKS

(75) Inventors: Yousuf Saifullah, Richardson, TX (US); Shashikant Maheshwari, Irving, TX (US); Haihong Zheng, Coppell, TX (US)

(73) Assignee: Nokia Corporation, Espoo (FI)

( * ) Notice: Subject to any disclaimer, the term of this patent is extended or adjusted under 35 U.S.C. 154(b) by 735 days.

(21) Appl. No.: 11/871,649

(22) Filed: Oct. 12, 2007

(65) Prior Publication Data

US 2008/0117854 A1 May 22, 2008

Related U.S. Application Data

(60) Provisional application No. 60/829,610, filed on Oct. 16, 2006.

(51) Int. Cl.
*H04B 7/216* (2006.01)
(52) U.S. Cl. .......................................... 370/315; 370/335
(58) Field of Classification Search .................. 370/315, 370/335, 342, 329, 441, 468
See application file for complete search history.

(56) References Cited

U.S. PATENT DOCUMENTS

| | | | |
|---|---|---|---|
| 6,272,117 | B1 | 8/2001 | Choi et al. |
| 6,711,416 | B1 | 3/2004 | Zhang |
| 6,990,090 | B2 | 1/2006 | Meier |
| 7,113,495 | B2 | 9/2006 | Furukawa |
| 7,646,752 | B1 * | 1/2010 | Periyalwar et al. ........... 370/338 |
| 7,889,713 | B2 | 2/2011 | Zheng et al. |
| 2002/0018448 | A1 | 2/2002 | Amis et al. |
| 2002/0080736 | A1 | 6/2002 | Furukawa |
| 2002/0102948 | A1 | 8/2002 | Stanwood et al. |
| 2002/0191573 | A1 * | 12/2002 | Whitehill et al. ............. 370/338 |
| 2003/0091014 | A1 | 5/2003 | Meier |
| 2004/0025018 | A1 | 2/2004 | Haas et al. |
| 2004/0109493 | A1 * | 6/2004 | Blessent et al. ............... 375/146 |
| 2004/0170147 | A1 * | 9/2004 | Take ............................. 370/335 |

(Continued)

FOREIGN PATENT DOCUMENTS

DE 10053809 A1 5/2002
(Continued)

OTHER PUBLICATIONS

Saifullah, Y. et al., "Resource Request for Bandwidth", IEEE 802.16 Presentation Submission Template (Rev 8.3), (Nov. 15, 2006),16j-06/189 pp. 5.

(Continued)

*Primary Examiner* — Brian Nguyen
(74) *Attorney, Agent, or Firm* — Brake Hughes Bellermann LLP

(57) ABSTRACT

Various example embodiments are disclosed relating to relay networks or multi-hop networks, and also relating to bandwidth allocation for relay networks. According to an example embodiment, a method of allocating bandwidth in a relay network may include receiving at a relay station a first code (e.g., a first CDMA code) from a first station (e.g., mobile station) via a first link, sending a second code (e.g., second CDMA code) from the relay station to a second station (e.g., a base station) via a second link in response to receiving the first code, the second code being one of a plurality of codes assigned to the relay station, and receiving a bandwidth allocation message at the relay station from the second station, the bandwidth allocation message including the second code and indicating an allocation of bandwidth for a transmission over at least one of the first link and/or the second link.

24 Claims, 14 Drawing Sheets

U.S. PATENT DOCUMENTS

| | | | |
|---|---|---|---|
| 2005/0058151 A1* | 3/2005 | Yeh | 370/445 |
| 2005/0064818 A1 | 3/2005 | Assarsson et al. | |
| 2005/0117539 A1* | 6/2005 | Song et al. | 370/328 |
| 2005/0232183 A1* | 10/2005 | Sartori et al. | 370/319 |
| 2005/0286547 A1 | 12/2005 | Baum et al. | |
| 2006/0029011 A1 | 2/2006 | Etemad et al. | |
| 2006/0107166 A1 | 5/2006 | Nanda | |
| 2006/0176973 A1* | 8/2006 | Alamouti et al. | 375/267 |
| 2007/0097915 A1 | 5/2007 | Papasakellariou | |
| 2007/0097945 A1 | 5/2007 | Wang et al. | |
| 2007/0110016 A1 | 5/2007 | Shen et al. | |
| 2008/0002610 A1 | 1/2008 | Zheng et al. | |
| 2008/0039014 A1 | 2/2008 | Tsai et al. | |
| 2008/0056193 A1* | 3/2008 | Bourlas et al. | 370/331 |
| 2008/0069067 A1 | 3/2008 | Sood et al. | |
| 2008/0075184 A1 | 3/2008 | Muharemovic et al. | |
| 2008/0089309 A1 | 4/2008 | Groleau et al. | |
| 2008/0247375 A1 | 10/2008 | Muharemovic et al. | |
| 2008/0291847 A1 | 11/2008 | Zheng | |
| 2009/0092066 A1 | 4/2009 | Chindapol et al. | |
| 2009/0092067 A1 | 4/2009 | Sudarshan et al. | |
| 2009/0213766 A1 | 8/2009 | Chindapol et al. | |
| 2009/0268645 A1 | 10/2009 | Chindapol et al. | |
| 2009/0325578 A1 | 12/2009 | Li et al. | |
| 2010/0008326 A1 | 1/2010 | Albanese et al. | |
| 2010/0177717 A1 | 7/2010 | Sung et al. | |

FOREIGN PATENT DOCUMENTS

| | | |
|---|---|---|
| EP | 1389583 A1 | 2/2004 |
| EP | 1389853 A1 | 2/2004 |
| EP | 1524800 A2 | 4/2005 |
| EP | 1912390 A1 | 10/2006 |
| JP | 04-341031 A | 11/1992 |
| JP | 11-177622 A | 7/1999 |
| JP | 2001-237875 A | 8/2001 |
| WO | 99/14897 A2 | 3/1999 |
| WO | 0055640 A1 | 9/2000 |
| WO | 2006/023771 A2 | 3/2006 |
| WO | 2006096728 A2 | 9/2006 |
| WO | 2008004062 A2 | 1/2008 |
| WO | 2008004062 A3 | 1/2008 |
| WO | 2008004066 A2 | 1/2008 |
| WO | 2008004066 A3 | 1/2008 |
| WO | 2008047203 A2 | 4/2008 |
| WO | 2008047203 A3 | 4/2008 |
| WO | 2008/004062 A8 | 3/2009 |
| WO | 2009/047709 A2 | 4/2009 |
| WO | 2009/047709 A3 | 8/2009 |

OTHER PUBLICATIONS

Saifullah, Y. et al., "Resource Request for Bandwidth", IEEE 802.16 Broadband Wireless Access Working Group, (Jan. 18, 2007),16j-07/039r3 pp. 9.

Saifullah, Y. et al., "Clarification on CDMA Codes TLV", IEEE 802.16 Broadband Wireless Access Working Group, (Jul. 13, 2007),16j-07/402r3 pp. 3.

Pabst, R. "Realy-Based Deployment Concepts for Wireless and Mobile Broadband Radio", IEEE Communications Magazine, (Sep. 2004), pp. 80-88.

Johnson, D. B., "Dynamic Source Routing in Ad Hoc Wireless Networks", Carnegie Mellon University, (1995), pp. 1-18.

"Air Interface for Fixed Broadband Wireless Access Systems", IEEE Standard 802.16-2004, (Oct. 1, 2004), pp. 42-44.

Wiemann, H et al., "A Novel Multi-Hop ARQ Concept", Vehicular Technology Conference, VTC 2005-Spring. 2005 IEEE 6st,(Jun. 2005),3097-3101.

Marks, R et al., "IEEE Standard 802.16: A Technical Overview of the WirelessMAN Air Interface for Broadband Wireless Access", Retrieved from: www.ieee802.org/16/docs/02/C80216-02__05.pdf,(Jun. 4, 2002),98/107.

Zheng, H et al., "Transmission Scheme of MAC Management Message towards a RS Group in multi-hop relay System", IEEE C802.16j-07__033, Retrieved from: www.ieee802.org/16/relay/index.html,(Jan. 8, 2007),section 1-2,4.

Zheng, H et al., "Harq with Relays", IEEE C802.16j-06/197r1, Retrieved from: www.ieee802.org/16/relay/index.html, whole document,(Nov. 7, 2006).

"DL/UL Offset FDD/H-FDD Frame Structure for Release 1.x: Harmonized Proposal", WiMAX Forum on Alcatel-Lucent, Oct. 2, 2007, pp. 1-9.

"Draft Standard for Local and Metropolitan area Networks Part 16: Air Interface for Broadband Wireless Access Systems", IEEE Computer Society P802.16Rev2/D2, Dec. 2007, pp. 114-536 (Section 6.3), pp. 742-1079 (Section 8.4), and pp. 1107-1263 (Section 11).

Search Report and Written Opinion for International Application No. PCT/IB2008/054113, mailed on Jun. 19, 2009, 16 pages.

"R1.x FDD/Full Duplex-Current status and open issues", WiMAX Forum, Mar. 12, 2008, 15 pages.

"R1.x FDD/HFDD Ad Hoc Mar. 2008 Recommendation to TWG", WiMAX Forum, Mar. 14, 2008, 5 pages.

"WiMAX FDD Proposal for REL 1.x", WiMAX Forum, Motorola, 2004, pp. 1-6.

Yagahoobi, Hassan "R1.5 FDD/HFDD Ad Hoc Apr. 2008 Opening Report", WiMAX Forum, Intel Corporation, Apr. 28, 2008, 5 pages.

Bacioccola, Andrea, et al., "R1.x FDD/Full Duplex—Current status and open issues", WiMAX Forum, Mar. 12, 2008, 15 pages.

"6.3.2.3.5 Ranging Request (RNG-REQ) message", IEEE, Air Interface for Fixed Broadband Wireless Access Systems, IEEE Std 802.16/2004, 2004, p. 49.

Axnas, J., et al., "Final report on identified RI key technologies system concept and their assessment", IST-2003-507581 Winner, D2.10 version 1.0, Dec. 25, 2005, pp. 1-2, 38-39, 83-96.

Bacioccola, Andrea, et al., "R1.x FDD/Full Duplex—Current status and open issues", WiMAX Forum, Nokia, Mar. 15, 2008, 15 pages.

Bacioccola, Andrea et al., "R1.x FDD/Full Duplex-Current Status and Open Issues", WiMAX Forum, Nokia and NSN, Apr. 15, 2008, 8 pages.

Bacioccola, Andrea et al., "R1.x FDD/Full Duplex-Current Status", WiMAX Forum, Nokia, NSN and Huawei, Apr. 15, 2008, 13 pages.

Campbell, Andrew T., et al., "Spawning Networks", IEEE Network, IEEE Inc. New York, US, Jul./Aug. 1999, pp. 16-29.

Chion, Mary, et al., "Fix for Problems in UL Allocation", IEEE 802.16 Broadband Wireless Access Working Group, Nortel Networks, Jun. 13, 2005, pp. 1-4.

European Search Report for EP Application No. EP 02018385, mailed on Jan. 29, 2003, 3 pages.

Gal, Dan, "Support of Full Duplex MS (OFDMA FDD) in draft IEEE 802.16Rev2/D4", WiMAX Forum, Alcatel-Lucent, Apr. 7, 2008, pp. 1-6.

"IEEE Standard for Local and metropolitan area networks; Part 16: Air Interface for Fixed Broadband Wireless Access Systems", IEEE, IEEE Std 802.16, Oct. 1, 2004, 894 pages.

Kim, Kyung-Ah, et al., "A Seamless Handover Mechanism for IEEE 802.16e Broadband Wireless Access", School of Electrical Engineering and Computer Science, Seoul National University, Seoul, Republic of Korea, Feb. 28, 2005, pp. 1-8.

McBeath, Sean et al., "DCD/UCD Consideration for FDD", WiMAX Forum, 5 pages.

McBeath, Sean et al., "Serving F-FDD Mobile Stations v2", WiMAX Forum, 5 pages.

Otyakmaz, et al., "Parallel Operation of Half- and Full-Duplex FDD in Future Multi-Hop Mobile Radio Networks", XP-002519328, Jun. 22, 2008, pp. 1-7.

Schultz, D. et al., "Proposal of the best suited deployment concepts for the identified scenarios and related RAN protocols", IST-2003-507581 Winner, D3.5 version 1.0, Dec. 31, 2005, pp. 1-2, 58-67, and 93-97.

Seol, Ji-Yun, "Rel1.x FDD/HFDD Flexible UL allocation signaling for F-FDD MS in H-FDD frame structure", WiMAX Forum, Samsung Electronics, Apr. 2008, pp. 1-9.

Villela, Daniel, et al., "Virtuosity: Programmable Resource Management for Spawning Networks", Computer Networks, Elsevier Science Publishers B.V., Amsterdam, NL, vol. 36, No. 1, Jun. 2001, pp. 1-29.

Xu, Allan, et al., "R1.x FDD/Full Duplex Additional Option for 2 MAP Approach", WiMAX Forum, Huawei, Apr. 28, 2008, 4 pages.

IEEE, "Part 16: Air Interface for Broadband Wireless Access Systems", DRAFT Standard for Local and metropolitan area networks, IEEE 802.16Rev2/D5, Jun. 2008, 83 pages.

Office Action for Israeli Application Serial No. 195928, mailed Feb. 24, 2010, including English Translation, 2 pages.

IEEE, "Part 16: Air Interface for Fixed and Mobile Broadband Wireless Access Systems", Multihope Relay Specification, Baseline Doucment for Draft Standard for Local and Metropolitan Area Networks, IEEE 802.16j-06/026r4, Jun. 6, 2007, 203 pages.

U.S. Appl. No. 12/035,262, filed Feb. 21, 2008, titled Frame Structures With Flexible Partition Boundary for Wireless Networks.

U.S. Appl. No. 12/049,265, filed Mar. 14, 2008, titled Techniques for Link Utilization for Half-Duplex and Full-Duplex Stations in a Wireless Network.

U.S. Appl. No. 10/089,426, filed Mar. 29, 2002, titled Radio Link System.

Non-Final Office Action for U.S. Appl. No. 12/049,265, mailed Jul. 22, 2010, 30 pages.

Office Action for Russian Patent Application No. 2009117689 (with English Translation), mailed on Aug. 13, 2010, 12 pages.

Non-Final Office Action for U.S. Appl. No. 11/480,767, mailed on Aug. 18, 2010, 18 pages.

Final Office Action for U.S. Appl. No. 11/549,387, mailed on Aug. 5, 2010, 7 pages.

Final Office Action for U.S. Appl. No. 11/480,767, mailed Feb. 3, 2011, 13 pages.

Notice of Allowance for U.S. Appl. No. 11/549,387, mailed Oct. 19, 2010, 14 pages.

Non-Final Office Action Response for U.S. Appl. No. 12/049,265, filed Jan. 18, 2011, 15 pages.

Final Office Action for U.S. Appl. No. 12/049,265, mailed Mar. 18, 2011, 19 pages.

Gal, "Support of Full Duplex MS (OFDMA FDD) in draft IEEE 802.16Rev21D4", Alcatel-Lucent, Apr. 7, 2008, 6 pages.

Office Action for Indonesian Patent Application No. W00 2008 04127 (with English Translation), mailed Feb. 17, 2011, 6 pages.

Jang, Heejin, et al., "Mobile IPv6 Fast Handovers Over IEEE 802.16e Networks", MIPSHOP Working Group, Internet Draft, Nov. 16, 2007, 18 pages.

Office Action for Korean Patent Application No. 2008-7031882 (with English Translation), mailed Nov. 29, 2010, 4 pages.

Schults, et al, "Proposal of the best Suited Deployment Concepts for the Identified Scenarios and related RAN Protocols", IST-2003-507581 Winner, D3.5 Version 1.0, Dec. 31, 2005, 150 pages.

Response to Final Office Action for U.S. Appl. No. 11/480,767, filed May 9, 2011, 12 pages.

Response to Final Office Action for U.S. Appl. No. 11/480,767, filed May 18, 2011, 5 pages.

Office Action for Indonesian Application No. W00200804069 (with English Translation), mailed on Apr. 11, 2011, 4 pages.

Office Action for Chinese Application No. 200780024974.1 (with English Translation), mailed on Apr. 20, 2011, 9 pages.

Office Action received for Korean Patent Application Serial No. 2008-7031882, mailed Sep. 30, 2011, 8 pages including 4 pages of English translation.

Office Action for Korean Patent Application No. 2008-7031888, mailed on Apr. 20, 2011, 4 pages.

Office Action for Japanese Patent Application No. 2009-517470, mailed on Jun. 13, 2011, 16 pages.

Office Action for Japanese Application No. 2009-517471, mailed on Jun. 13, 2011, 9 pages.

Office Action Response for Korean Patent Application No. 2008-7031888, filed on Jun. 20, 2011, 26 pages.

Office Action for Chinese Patent Application No. 200780024815.1, mailed on Apr. 26, 2011, 19 pages.

Shen, Gang et al., "Recommendations on IEEE 802.16j", IEEE 802.16 Presentation Submission Template (Rev. 8.3), IEEE C802.16j-06/004r1, May 8, 2006, 15 pages.

Wiemann, Henning et al., "A Novel Multi-Hop ARQ Concept", IEEE Vehicular Technology Conference, vol. 5, Jun. 1, 2005, 5 pages.

Non-Final Office Action for U.S. Appl. No. 11/480,767, mailed on Jun. 7, 2011, 19 pages.

U.S. Appl. No. 11/480,767, filed Jul. 3, 2006, Non-Final Office Action Response filed Sep. 7, 2011 for Non-Final Office Action mailed Jun. 7, 2011, 10 pages.

U.S. Appl. No. 11/480,767, filed Jul. 3, 2006, Notice of Allowance mailed Nov. 16, 2011, 11 pages.

U.S. Appl. No. 12/049,265, filed Mar. 14, 2008, Notice of Allowance mailed Oct. 13, 2011, 20 pages.

Korean Office Action Received Oct. 26, 2011, for Application No. 2011-056535608, mailed on Sep. 30, 2011, 4 pages.

Korean Notice of Allowance mailed Aug. 10, 2011, for Application No. 2008-7031888, 3 pages.

Japanese Notice of Allowance mailed Nov. 11, 2011, for Application No. 2009-517470, 3 pages.

Japanese Notice of Allowance mailed Nov. 11, 2011, for Application No. 2009-517471, 3 pages.

U.S. Appl. No. 12/498,634, filed Jul. 7, 2009, Non-Final Office Action mailed Oct. 4, 2011, 34 pages.

* cited by examiner

BANDWIDTH ALLOCATION FOR RELAY NETWORKS

CROSS-REFERENCE TO RELATED APPLICATION

This application claims priority to U.S. Provisional Application Ser. No. 60/829,610, filed on Oct. 16, 2006, entitled "Bandwidth Allocation for Relay Networks," which is incorporated by reference.

BACKGROUND

The rapid diffusion of Wireless Local Area Network (WLAN) access and the increasing demand for WLAN coverage is driving the installation of a very large number of Access Points (AP). The most common WLAN technology is described in the Institute of Electrical and Electronics Engineers IEEE 802.11 family of industry specifications, such as specifications for IEEE 802.11b, IEEE 802.11g and IEEE 802.11a. Other wireless technologies are also being developed, such as IEEE 802.16 or WiMAX technology.

As an example, a wireless relay network may include a multi-hop system in which end nodes such as mobile stations or subscriber stations (MS/SSs) may be coupled to a base station (BS) or Access Point (AP) via one or more relay stations (RSs). Thus, traffic between MS/SSs and the BS/AP may pass and be processed by the relay stations. The 802.16 Mobile Multi-hop Relay (MMR), referenced in IEEE 802.16 Working Group (WG), is an example of a set of specifications relating to the relay concept. The MMR specifications include a focus on defining a network system that uses relay stations (RSs) to extend network coverage and/or enhance system throughput. These are a few examples of wireless network specifications, and there are many other technologies and standards being developed.

Solutions are desirable that allow allocation of network resources for multi-hop or relay networks.

SUMMARY

Various example embodiments are disclosed relating to relay networks or multi-hop networks, and also relating to bandwidth allocation for relay networks. A relay network may include, for example, a base station, a mobile station/subscriber station, and one or more relay stations that may couple a mobile station to a base station.

According to an example embodiment a method of allocating bandwidth in a relay network may include receiving at a relay station a first code (e.g., a first Code Division Multiple Access (CDMA) code) from a first station (e.g., mobile station) via a first link, sending a second dedicated code (e.g., second CDMA code) from the relay station to a second station (e.g., a base station) via a second link in response to receiving the first code, the second dedicated code being one of a plurality of codes assigned to the relay station, each one of the codes associated with a respective procedure, and receiving a bandwidth allocation message at the relay station from the second station, the bandwidth allocation message including the second dedicated code and indicating an allocation of bandwidth for a transmission over at least one of the first link and/or the second link.

For example, the sending may include sending a second CDMA code from the relay station to a second station in response to receiving a first CDMA code, the second dedicated code being one of a plurality of CDMA codes assigned to the relay station, the second dedicated code being one of the following, for example: a CDMA code for mobile station ranging continue, a CDMA code for mobile station ranging complete, a CDMA code for a mobile station bandwidth request for data transmission, or a CDMA code for a Hybrid ARQ (hybrid automatic repeat request) retransmission.

The method may further include: forwarding the bandwidth allocation message from the relay station to the first station, the forwarded bandwidth allocation message including the first code, receiving at the relay station a first message from the first station via the allocated bandwidth over the first link, and transmitting from the relay station to the second station a second message via the allocated bandwidth over the second link. Alternatively, the method may further include: sending a message from the relay station to the first station via the allocated bandwidth over the first link.

According to another example embodiment a method may include: receiving at a relay station a first CDMA code from a mobile station via a first link, the first CDMA code being at least temporarily associated with the mobile station and for a first procedure (e.g., ranging, bandwidth request for data transmission, etc.), sending a second CDMA code from the relay station to a second station via a second link in response to receiving the first CDMA code, the second CDMA code being one of a plurality of CDMA codes assigned to the relay station, the second CDMA code being related to the procedure of the first CDMA code, and receiving a bandwidth allocation message at the relay station from the second station, the bandwidth allocation message including the second CDMA code and indicating an allocation of bandwidth for a transmission over the first link and the second link.

For example, an originating relay station (e.g., coupled to a requesting mobile station) may receive a MS CDMA code associated with a procedure from a mobile station (MS) and may transmit or send a RS CDMA code assigned to the originating relay station and associated with the same or similar procedure to another station, such as to a base station or a second relay station. If the RS CDMA code is transmitted to a second relay station, the second relay station may forward the RS CDMA code (assigned to the originating relay station) on to a base station (BS). There may be any number of relay stations provided between a MS and a BS, for example. For example, in response to receiving a MS CDMA code from a MS, the originating RS (or RS closest to or attached to a MS) may transmit or send a RS CDMA code upstream to a second RS or BS. The upstream relay stations may simply forward the RS CDMA code up to the BS, where the BS may allocate bandwidth or resources on one or more links, e.g., based on the procedure and the topology or network path between the MS and the BS. There may be any number of relay stations, and any number of links for which bandwidth may be allocated by a BS.

According to another example embodiment, an apparatus for wireless communications may be provided. The apparatus may include a controller, a memory coupled to the controller, and a wireless transceiver coupled to the controller. The apparatus may be adapted to: receive at a relay station a first code from a first station via a first link, send a second code from the relay station to a second station via a second link in response to receiving the first code, the second code being one of a plurality of codes assigned to the relay station, and receive a bandwidth allocation message at the relay station from the second station, the bandwidth allocation message including the second code and allocating bandwidth for a transmission over at least one of the first link or the second link.

According to another example embodiment, an apparatus for wireless communications may be provided. The apparatus may include: a controller, a memory coupled to the controller, and a wireless transceiver coupled to the controller. The apparatus may be adapted to: receive at a relay station a first CDMA code from a mobile station via a first link, the first CDMA code being at least temporarily associated with the mobile station and for a first procedure, send a second CDMA code from the relay station to a second station via a second link in response to receiving the first CDMA code, the second CDMA code being one of a plurality of CDMA codes assigned to the relay station, the second CDMA code being related to the procedure of the first CDMA code. The apparatus may also be adapted to receive a bandwidth allocation message at the relay station from the second station, the bandwidth allocation message including the second CDMA code and allocating or indicating an allocation of bandwidth for a transmission over the first link and the second link.

In another example embodiment, a method of allocating bandwidth in a relay network may be provided, including: receiving a CDMA code at a base station from a first station (e.g., a mobile station or other relay station), the CDMA code being one of a plurality of CDMA codes assigned to a relay station, the CDMA code associated with a procedure, allocating bandwidth for one or more wireless relay links in the relay network based on the procedure for the CDMA code, and sending a bandwidth allocation message to the first station, the bandwidth allocation message including the CDMA code and indicating an allocation of bandwidth for a transmission over one or more of the wireless relay links.

In yet another example embodiment, an apparatus for wireless communications may be provided. The apparatus may include, for example: a controller, a memory coupled to the controller, and a wireless transceiver coupled to the controller. The apparatus may be adapted to: receive a CDMA code at a base station from a first station, the CDMA code being one of a plurality of CDMA codes assigned to a relay station, the CDMA code associated with a procedure, allocate bandwidth for one or more wireless relay links in the relay network, e.g., based on the procedure for the CDMA code and a relay path to a mobile station, and send a bandwidth allocation message to the first station, the bandwidth allocation message including the CDMA code and indicating an allocation of bandwidth for a transmission over the one or more wireless relay links.

The details of one or more implementations are set forth in the accompanying drawings and the description below. Other features will be apparent from the description and drawings.

DETAILED DESCRIPTION

Figure 1:
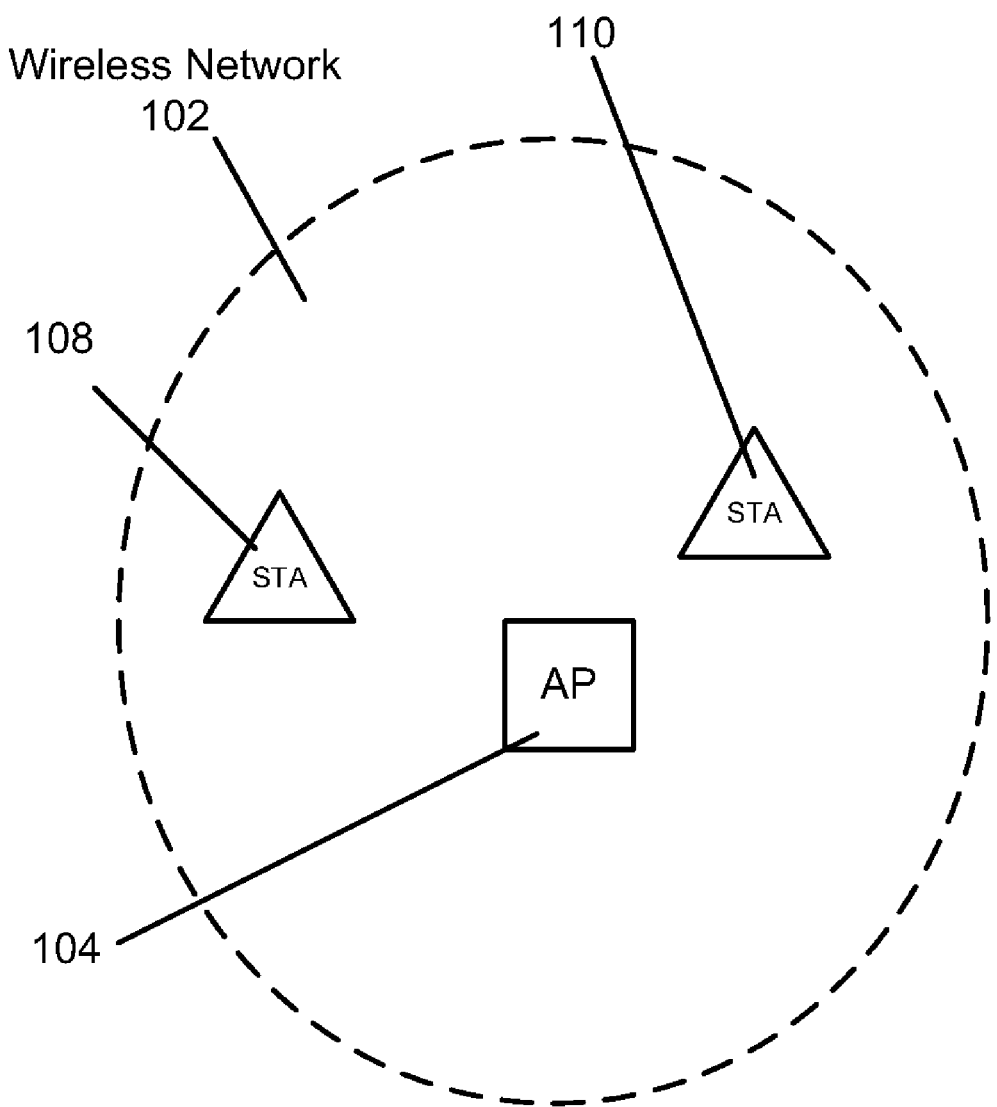
FIG. 1 is a block diagram illustrating a wireless network according to an example embodiment.

Referring to the Figures in which like numerals indicate like elements, FIG. 1 is a block diagram illustrating a wireless network 102 according to an example embodiment. Wireless network 102 may include a number of wireless nodes or stations, such as an access point (AP) 104 or base station and one or more mobile stations or subscriber stations, such as stations 108 and 110. While only one AP and two mobile stations are shown in wireless network 102, any number of APs and stations may be provided. Each station in network 102 (e.g., stations 108, 110) may be in wireless communication with the AP 104, and may even be in direct communication with each other. Although not shown, AP 104 may be coupled to a fixed network, such as a Local Area Network (LAN), Wide Area Network (WAN), the Internet, etc., and may also be coupled to other wireless networks.

Figure 2:
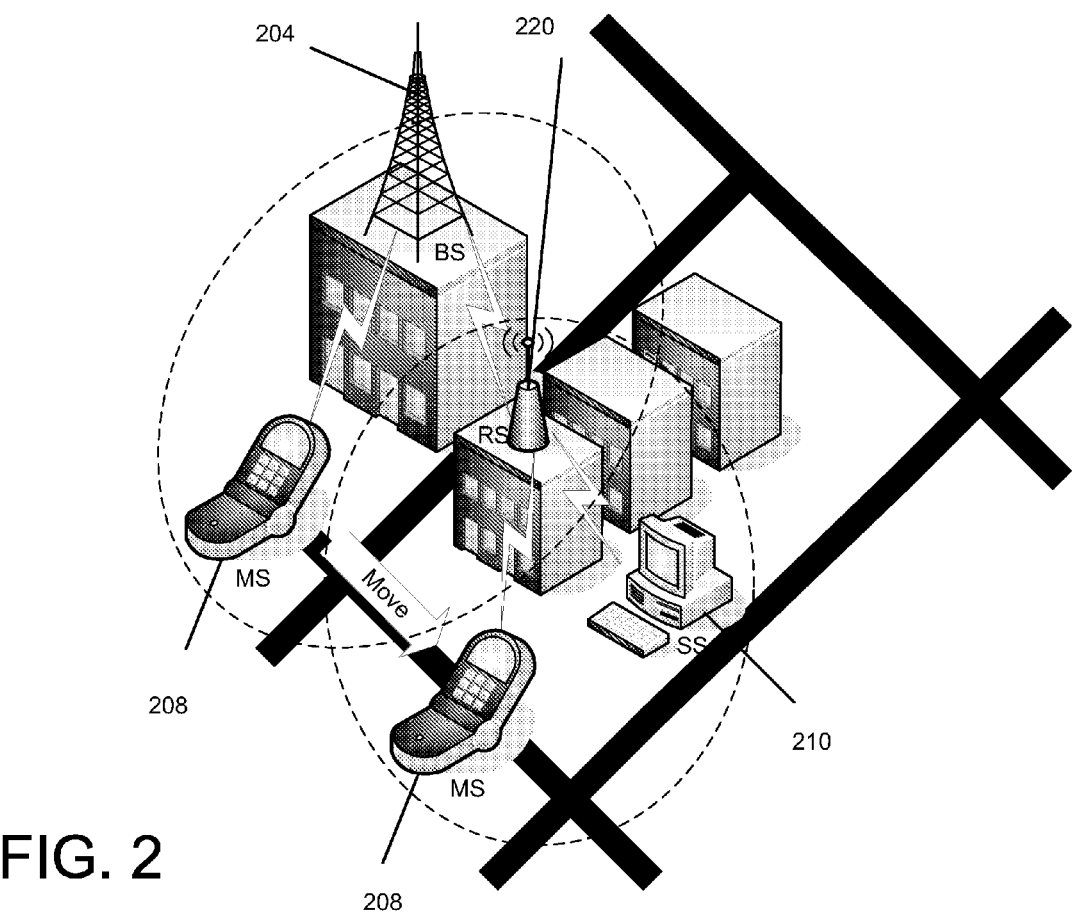
FIG. 2 is a block diagram illustrating a wireless network according to an example embodiment.

FIG. 2 is a block diagram illustrating a wireless network according to an example embodiment. According to an example embodiment, a mobile station MS 208 may initially communicate directly with a base station BS 204, for example, and a subscriber station 210 may communicate with the base station BS 204 via a relay station RS 220. In an example embodiment, the mobile station 208 may travel or move with respect to base station BS 204. For example, the mobile station MS 208 may move out of range of the base station BS 204, and may thus begin communicating with the base station 204 via the relay station 220 as shown in FIG. 2.

Figure 3A:
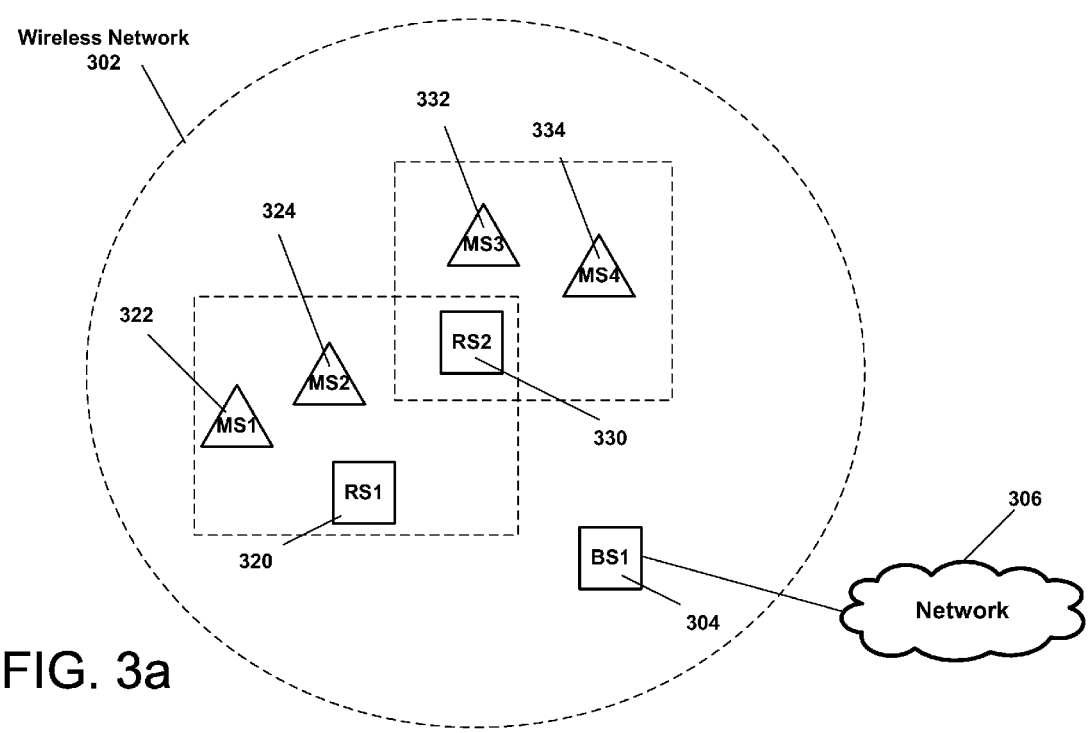
FIG. 3a is a block diagram illustrating a wireless relay network according to an example embodiment.

FIG. 3a is a block diagram illustrating a wireless network 302 according to an example embodiment. Wireless network 302 may include a number of wireless nodes or stations, such as base station BS1 304, relay stations RS1 320 and RS2 330, a group of mobile stations, such as MS1 322 and MS2 324 communicating with relay station RS1 320, and MS3 332 and MS4 334 communicating with relay station RS2 330. As shown, relay station RS2 330 also communicates with relay station RS1 320. While only one base station, two relay stations, and four mobile stations are shown in wireless network 302, any number of base stations, relay stations, and mobile stations may be provided. The base station 304 may be coupled to a fixed network 306, such as a Wide Area Network (WAN), the Internet, etc., and may also be coupled to other wireless networks. The group of stations MS1 322, MS2 324, and RS2 330 may communicate with the base station BS1 304 via the relay station RS1 320. The group of stations MS3 332, MS4 334, may communicate with the base station BS1 304 via the relay station RS2 330, which communicates with the base station BS1 304 via the relay station RS1 320.

Figure 3B:
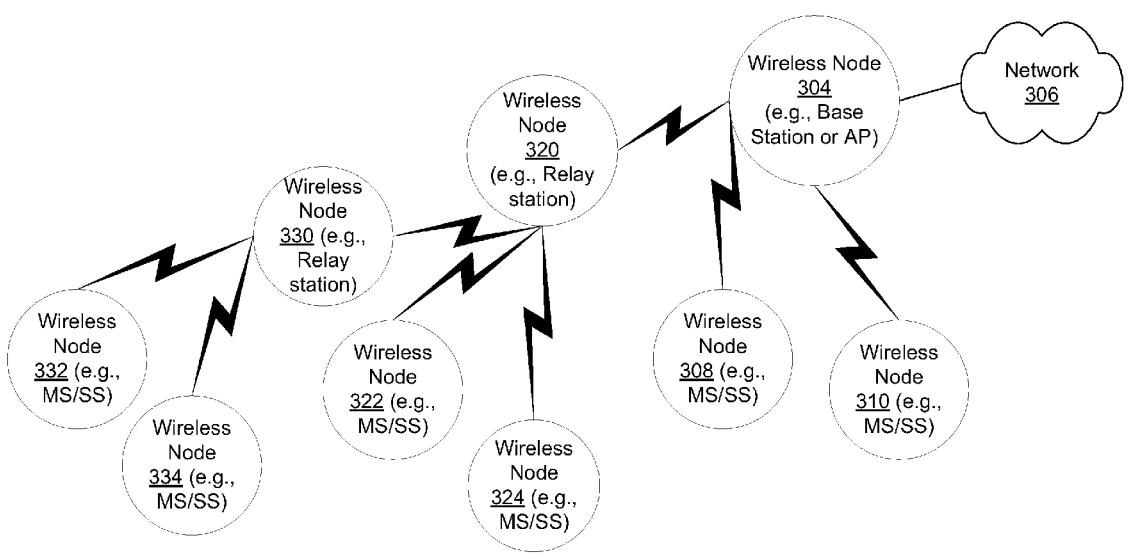
FIG. 3b is a diagram of a multi-hop environment according to an example embodiment.

FIG. 3b is a diagram of a multi-hop environment according to an example embodiment. A group of wireless nodes 332, 334, which may be mobile stations or subscriber stations (MS/SS) may each be coupled via a wireless link to a wireless node 330. As an example, the wireless nodes 332, 334 may include mobile telephones, wireless digital assistants (PDAs), or other types of wireless access devices, or mobile stations. The term "node" or "wireless node" or "network node" or "network station" may refer, for example, to a wireless station, e.g., a subscriber station or mobile station, an access point or base station, a relay station or other intermediate wireless node, or other wireless computing device, as examples. Wireless node 330 may include, for example, a relay station or other node. Wireless node 330 and other wireless nodes 322, 324 may each be coupled to a wireless node 320 via a wireless link. Wireless node 320 and other wireless nodes 308, 310 may each may be coupled to a wireless node 304 via a wireless link. Wireless node 304 may be, for example, a base station (BS), access point (AP) or other wireless node. Wireless node 304 may be coupled to a fixed network, such as network 306, for example. Frames or data flowing from nodes 332, 334 to 330, 322 324, and 330 to 320, and 308, 310, 320 to node 304 may be referred to as flowing in the uplink (UL) or upstream direction, whereas frames flowing from node 304 to nodes 308, 310, and to node 320 and then to nodes 330, 322, 324, 332, and 334 may be referred to as flowing in the downlink (DL) or downstream direction, for example.

Figure 4A:
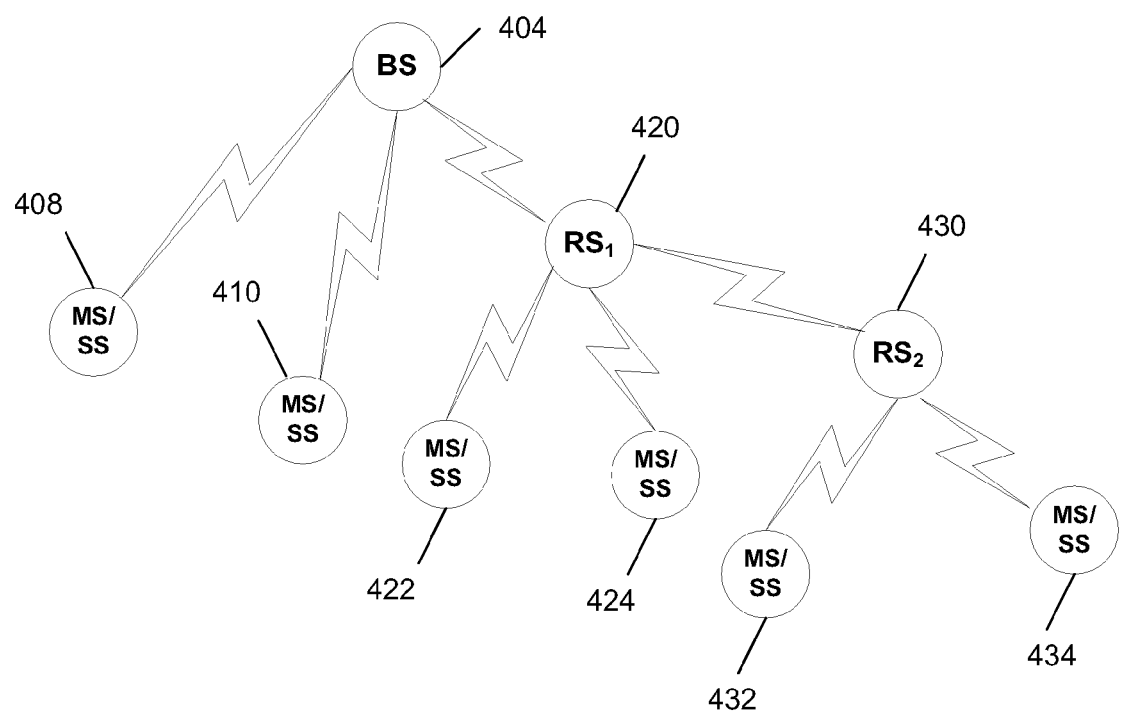
FIGS. 4a-4b are block diagrams illustrating wireless relay networks according to example embodiments.
Figure 4B:
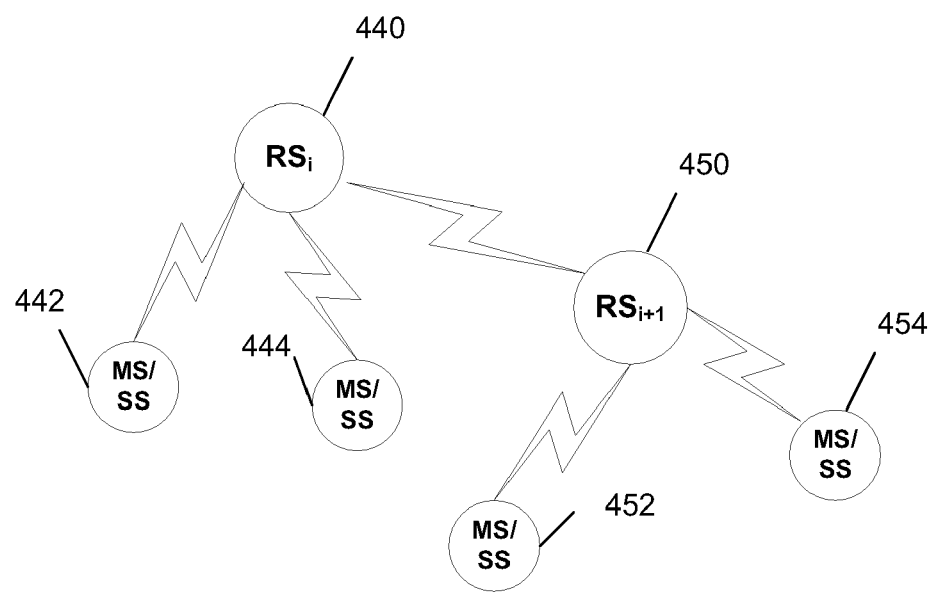

FIGS. 4a-4b are block diagrams illustrating wireless relay networks according to example embodiments. According to an example embodiment, an example relay network may include n levels of RSs. As an example, a two-level-relay-station architecture is illustrated in FIG. 4a. Thus, as shown in the example, MS/SS 408, MS/SS 410, and RS1 420 are coupled to, or directly attached to a base station BS 404.

Similarly, as shown in the example, MS/SS 422, MS/SS 424, and RS2 430 are coupled to, or directly attached to the RS1 420. Further, as shown in the example, MS/SS 432 and MS/SS 434 are coupled to, or directly attached to the relay station RS2 430. The term "attach" may, for example, refer to connecting to a network system or network node over a link, for example, a node may attach to a network system or another node by directly coupling with the other node. The term "attachment" may thus, for example, refer to a connection to a network system or network node over a link, for example, via a direct coupling between network nodes. Generally, a node may attach or connect to a system in order to obtain service from the system via another node.

For the generic example as shown, a wireless node indicated as $RS_0$ may include a base station. According to an example embodiment, one or more relay stations, for example, $RS_i$ 440, $RS_{i+1}$ 450 may receive data units and forward the data units to the next level of the wireless relay network.

Figure 5A:
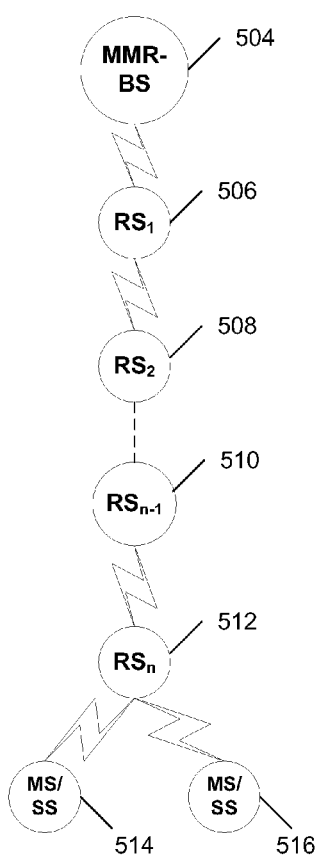
FIGS. 5a-5b are block diagrams illustrating wireless relay networks according to example embodiments.
Figure 5B:
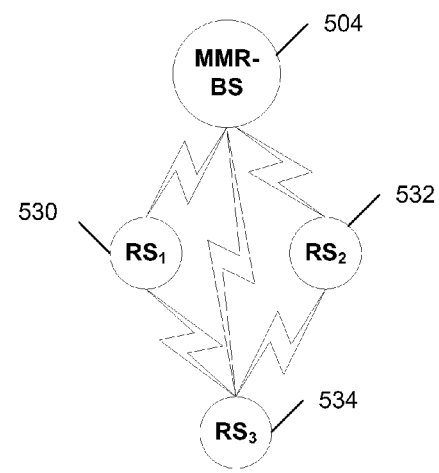

FIGS. 5a-5b are block diagrams illustrating wireless relay networks according to example embodiments. As shown in FIG. 5a, a Mobile Multi-hop Relay base station (MMR-BS) 504 may have a relay station, for example, $RS_1$ 506, directly coupled, or directly attached to MMR-BS 504. Further, as shown, a relay station, for example, $RS_2$ 508 may be directly attached to $RS_1$ 506. Other intermediate network nodes may be included in a communication path between a relay station $RS_{n-1}$ 510 and $RS_2$ 508. Additionally, a relay station $RS_n$ 512 may be attached to $RS_{n-1}$ 510. Multi-hop subscriber stations, for example, MS/SS 514, 516 may be attached to $RS_n$ 512. Thus, as shown in FIG. 5a, there may exist communication paths, for example, between MMR-BS 504 and MS/SS 514 and between MMR-BS 504 and MS/SS 516. For example, a communication path between MMR-BS 504 and MS/SS 514 may include MMR-BS 504, $RS_1$ 506, $RS_2$ 508, $RS_{n-1}$ 510, $RS_n$ 512, and all network nodes in a communication path between $RS_2$ 508 and $RS_{n-1}$ 510. As another example, a communication path between MMR-BS 504 and MS/SS 516 may include MMR-BS 504, $RS_1$ 506, $RS_2$ 508, $RS_{n-1}$ 510, $RS_n$ 512, and all network nodes in a communication path between $RS_2$ 508 and $RS_{-1}$ 510. The MS/SS 514, 516 may also include mobile stations.

As shown in FIG. 5b, a relay station, for example, $RS_3$ 534 may be directly attached to multiple network nodes, for example, relay stations $RS_1$ 530, $RS_2$ 532, which may both be directly attached to a base station, for example, MMR-BS 504. Thus, for the example shown in FIG. 5b, there may exist two or more communication paths between MMR-BS 504 and $RS_3$ 534: for example, a communication path that includes MMR-BS 504, $RS_1$ 530, and $RS_3$ 534, and a communication path that includes MMR-BS 504, $RS_2$ 532, and $RS_3$ 534. For example, one of the communication paths may include an uplink (UL) communication path between MMR-BS 504 and $RS_3$ 534 and another may include a downlink (DL) communication path between MMR-BS 504 and $RS_3$ 534.

The various example embodiments described herein may be applicable to a wide variety of networks and technologies, such as WLAN networks (e.g., IEEE 802.11 type networks), IEEE 802.16 WiMAX networks, relay networks, 802.16 Mobile Multi-hop Relay (MMR) networks, as referenced in IEEE 802.16 Working Group (WG), WiMedia networks, Ultra Wide Band networks, cellular networks, radio networks, or other wireless networks. In another example embodiment, the various examples and embodiments may be applied, for example, to a mesh wireless network, where a plurality of mesh points (e.g., Access Points) may be coupled together via wired or wireless links. The various example embodiments described herein may be applied to wireless networks, both in an infrastructure mode where an AP or base station may communicate with a station (e.g., communication occurs through APs), as well as an ad-hoc mode in which wireless stations may communicate directly via a peer-to-peer network, for example.

A wireless relay network may be an example of a multi-hop system in which end nodes, for example, mobile stations or subscriber stations (MS/SS), may be connected to a base station via one or more relay stations, such as RS1 320 and RS2 330, for example. Traffic between the mobile stations or subscriber stations and the base station may pass through, and be processed by, the relay stations RS1 320 and RS2 330, for example. As an example, a relay station may be used to extend the network coverage and/or enhance the system throughput. For example, the traffic sent from a relay station may be scheduled by the relay station itself or scheduled by the base station instead. In some cases, a relay station may receive and decode a frame from a base station, and then forward the frame to the respective mobile station or subscriber station.

The term "wireless node" or "network station" or "node," or the like, may include, for example, a wireless station, such as a mobile station or subscriber station, an access point (AP) or base station, a relay station, a wireless personal digital assistant (PDA), a cell phone, an 802.11 WLAN phone, a WiMedia device, a WiMAX device, a wireless mesh point, or any other wireless device. These are merely a few examples of the wireless devices and technologies that may be used to implement the various example embodiments described herein, and this disclosure is not limited thereto.

In a wireless network system without relay stations, a MS/SS may attach to a base station (BS) directly, and therefore, the BS is aware of the route (i.e., only the one-hop route) to each of the attached MS/SS. However, when a relay station (RS) is introduced between a MS/SS and a BS, an initial attachment request, e.g., a Ranging Request (RNG-REQ) in accordance with IEEE 802.16, may be sent from the MS/SS to the BS through one or more RSs. If there are two or more RSs on the path between a MS/SS and a BS, e.g., as discussed regarding MMR-BS 504, $RS_1$ 506, ..., $RS_n$ 512, MS/SS 514 with regard to FIG. 5a, then upon receiving the initial attachment request, the BS, e.g., MMR-BS 504 may be able to determine the last RS, e.g., $RS_1$ 506, on the path from the MS/SS 514 to the MMR-BS 504 as shown in FIG. 5a, but not all the other RSs on the path. Thus the BS, e.g., MMR-BS 504 may not be able to obtain the topology as well as the routing path between the MS/SS, e.g., MS/SS 514 and the BS, e.g., MMR-BS 504.

However, in scenarios such as, e.g., centralized scheduling wherein a BS may schedule the resources for traffic transmissions over every segment on the path between a MS/SS and the BS, the BS may need to determine an exact path between a MS/SS and the BS. If the BS is able to determine the exact path, then as a result of determining a route between the MS/SS and the BS, the BS may determine information relating to the number of hops, the radio condition, etc., on each path. Such information may be used, for example, for the BS to determine scheduling algorithms during regular traffic sessions or during handover.

According to an example embodiment, when a RS, e.g., $RS_1$ 506 as shown in FIG. 5a, attaches directly to a BS, e.g., MMR-BS 504, the BS may record the path to the RS as a direct link. For example, the BS may store information associated with the path as network topology information, for example, in a storage device associated with the BS.

The term "network topology" may refer, for example, to a pattern of links connecting pairs of nodes of a network. Thus, a given node may have one or more links to other nodes, and the links may appear in a variety of different shapes. For example, a simple connection may include a one-way link between two devices. More generally, the term "network topology" or "topology" may be used to describe a configuration of a computer network. Thus, for example, each of FIGS. 1-5b may be understood to represent various network topologies.

When a RS, e.g., $RS_2$ 508 in FIG. 5a, acting as a MS/SS attaches to the system, e.g., via $RS_1$ 506, e.g., by a direct coupling with $RS_1$ 506, $RS_2$ 508 may send an attachment request, for example, via a ranging request message. Upon receiving the attachment request, $RS_1$ 506, e.g., may stamp its signature, e.g., a RS identifier associated with $RS_1$ 506, to the attachment request and may forward the modified attachment request to the BS, e.g., the MMR-BS 504. Upon receiving the attachment request from $RS_2$ 508 with the signature of $RS_1$ 506, the BS, e.g., MMR-BS 504, may determine that $RS_2$ 508 is attached to the system via $RS_1$ 506. Since MMR-BS 504 may have already determined the route between MMR-BS 504 and $RS_1$ 506, e.g., as a result of the $RS_1$ 506 attachment process, MMR-BS 504 may determine the topology and/or a path between MMR-BS 504 and $RS_2$ 508. The BS, e.g., MMR-BS 504 may then update its network topology information, e.g., to indicate a communication path between MMR-BS 504 and $RS_2$ 508 that includes $RS_1$ 506.

According to an example embodiment, this technique may be extended as other network nodes attach to network nodes in the current network topology. Thus, when a RS, e.g., $RS_n$ 512 in FIG. 5a, acting as a MS/SS, attaches to the system, e.g., via $RS_{n-1}$ 510, $RS_n$ 512 may send an attachment request, for example, via a ranging request message. Upon receiving the attachment request, $RS_{n-1}$ 510 may stamp its signature to the attachment request and forward the modified attachment request to the BS, e.g., MMR-BS 504. Any other RSs beyond $RS_{n-1}$ in the relevant communication path may simply forward the modified attachment request to the next hop. Upon receiving the modified attachment request from $RS_n$ 512 with the signature of $RS_{n-1}$ 510 (e.g., an RS-ID associated with $RS_{n-1}$ 510), the BS, MMR-BS 504 may determine that $RS_n$ 512 is attached to the system via $RS_{n-1}$ 510. Since MMR-BS 504 may have already determined the route between the MMR-BS 504 and $RS_{n-1}$ 510, e.g., as a result of the $RS_{n-1}$ 510 attachment process, MMR-BS 504 may determine the topology and/or a path between MMR-BS 504 and $RS_n$ 512. MMR-BS 504 may then update the network topology information to indicate a communication path between MMR-BS 504 and $RS_n$ 512.

When a MS/SS, e.g., MS/SS 514 attaches to the system via $RS_n$ 512, the MS/SS 514 may send an attachment request, for example, via a ranging request message. Upon receiving the attachment request, $RS_n$ 512 may stamp its signature (e.g., an RS-ID associated with $RS_n$ 512) to the attachment request and forward the modified attachment request to the BS, e.g., MMR-BS 504. Any other RSs beyond $RS_n$ 512 (e.g., $RS_{n-1}$ 510, $RS_2$ 508, $RS_1$ 506) may simply forward the modified attachment request to the next hop. Upon receiving the modified attachment request from the MS/SS 514 with the signature of $RS_n$ 512, the BS, e.g., MMR-BS 504 may determine that the MS/SS 514 is attached to the system via $RS_n$ 512. Since the MMR-BS 504 may have already determined the route, e.g., communication path, between the MMR-BS 504 and $RS_n$ 512 e.g., as a result of the $RS_n$ 512 attachment process, the MMR-BS 504 may determine the topology and/or a route or communication path between the MMR-BS 504 and MS/SS 514. MMR-BS 504 may then update the network topology information to indicate the communication path between MMR-BS 504 and MS/SS 514.

According to an example embodiment, a signature or stamp of a RS may include, for example, a RS-ID or other form of identity that may uniquely identify the RS. According to an example embodiment, the attachment request may include a ranging request (RNG-REQ) message. According to an example embodiment, the signature or stamp of the RS may be added to a received RNG-REQ message, e.g., by adding to the RNG-REQ message a TLV field including an RS-ID before forwarding the modified RNG-REQ message to the next hop toward the MMR-BS 504.

The techniques described herein may be used, for example, in accordance with an IEEE 802.16 system, wherein the attachment request may include, for example, a ranging request (RNG-REQ) message as specified by IEEE 802.16, with enhancements including the RS signature. However, it is understood that the techniques described herein may apply to any type of network system, including network systems other than IEEE 802.16 network systems.

A ranging request (RNG-REQ) message, for example as specified by IEEE 802.16, may be transmitted by a MS/SS at initialization and periodically, for example, to determine network delay and to request power and/or a downlink burst profile change. The RNG-REQ message may be sent, for example, in initial ranging and data grant intervals.

IEEE 802.16 OFDMA (Orthogonal Frequency Division Multiple Access) technology allows the use of Code Division Multiple Access (CDMA) codes for indicating certain procedures, such as Ranging procedure and bandwidth request procedure. In a single-hop network (e.g., no relay stations) where each MS is directly attached or coupled to a BS, the BS may allocate bandwidth on the single link between the MS and BS. However, in a multi-hop network or relay network, challenges exist regarding the communication of messages and CDMA codes via one or more relay stations, and allocation of bandwidth on multiple links across a network path.

Figure 6:
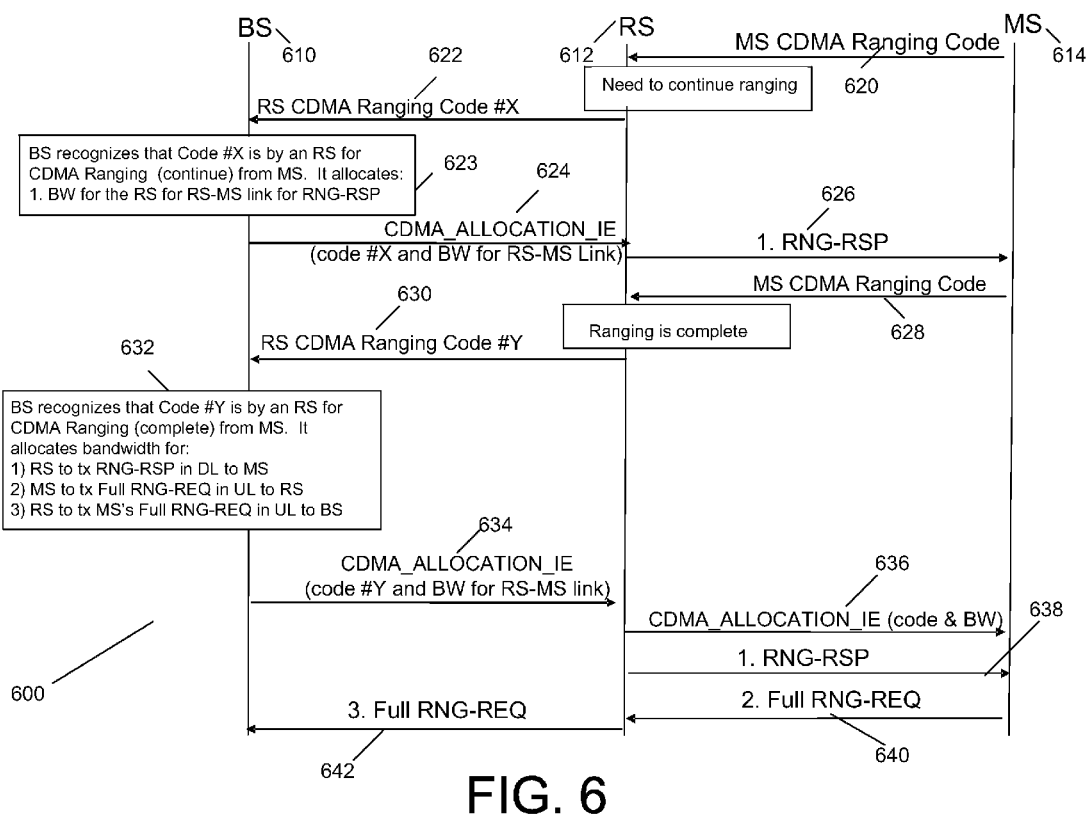
FIG. 6 is a diagram illustrating operation of a wireless network according to an example embodiment.

FIG. 6 is a diagram illustrating operation of a wireless network according to an example embodiment. The wireless network 600 may include, for example, a base station (BS) 610, a relay station (RS) 612, and a mobile station (MS) 614. This is merely an example, and any number of relay stations and mobile stations/subscriber stations may be provided. According to an example embodiment, a pool or group of CDMA (code division multiple access) codes may be available to mobile stations, such as MS 614. A different subset of CDMA codes may be assigned to each of a plurality of procedures for the mobile stations, such as ranging, bandwidth request for data transmission, and possibly other procedures. MS 614 may select one of the mobile station CDMA codes, based on the procedure the MS 614 is performing. The CDMA codes may allow, for example, the procedure being performed by the MS to be identified by a base station (since a subset of the MS CDMA codes are provided for each procedure). The CDMA code may be temporarily associated with the MS 614, such that a response back to the MS 614 from a BS or a relay station may include the same MS CDMA code to allow the MS 614 to match the BS response to its original request or message, for example.

In addition, according to an example embodiment, each relay station in a network may be assigned a group of CDMA codes, e.g., one code for each of a plurality of procedures. These CDMA codes may be assigned by the BS, e.g., at the time of RS initialization (e.g., for fixed RS), or when the RS is registered with the BS (e.g., for mobile RS). For example, each RS may receive its group of CDMA codes as part of the registration or initialization process with the BS. For example, each RS may be assigned a CDMA code for each of a plurality of different procedures, such as:

CDMA code for MS ranging (continue)
CDMA code for MS ranging (complete)
CDMA code for bandwidth request, e.g., for data transmission
CDMA code for HARQ (Hybrid ARQ) NACK indication These are merely some examples, and CDMA codes may be assigned to a RS for other procedures.

According to an example embodiment, the pool of codes assigned to relay stations may be different from a pool of CDMA codes allocated to mobile stations.

In another example embodiment, the pool of CDMA codes assigned to relay stations may be from the same pool of CDMA codes allocated for use by mobile stations. In such a case, the relay stations may differentiate themselves from mobile stations by using a different OFDMA channel. The OFDMA channel may include, for example, a subcarrier and a time slot or OFDM symbol. One of these parameters may be varied for a RS to distinguish the RS from a MS. For example, a subcarrier offset and/or a time slot (OFDM symbol) may be changed for the RS, if the CDMA codes used for the RS is from the same pool of CDMA codes used by MSs.

CDMA codes may be assigned to relay stations by a BS transmitting a message, such as a UCD (Uplink Channel Descriptor) broadcast message. The BS may send a UCD or other message to RSs, including TLV (type, length, value) for different CDMA codes. The BS may also send a UCD with TLV "start of Ranging codes group" indicating a code after the RS CDMA code, for example. In this way, MSs and RSs may be informed of their CDMA codes. Also, a same UCD may be used for informing RSs and MSs of CDMA codes, where TLVs indicating CDMA codes for RS may be placed at the end of the UCD, for example. Or, a separate message or UCD may be sent to indicate CDMA codes for RSs.

FIG. 6 illustrates a bandwidth allocation for a MS ranging procedure according to an example embodiment. Ranging may be performed to allow a mobile station, for example, to adjust its timing and transmission power. MS 614 may select a MS CDMA ranging code (e.g., indicating a ranging procedure for MS), and transmit this MS CDMA ranging code via a message 620 to RS 612. RS 612 may, for example, determine that ranging with the MS 614 should continue based on a need to adjust timing and/or transmission power for the MS 614, for example. RS 612 may then transmit a RS CDMA code for the same or a similar procedure to BS 610. In this example, the RS 612 may transmit a RS CDMA ranging code #X 622 (for ranging continue) to BS 610. The CDMA code #X 622 allows the RS 612 to identify itself to the BS 610 (since code #X is assigned to RS 612) and to identify to BS 610 the procedure being performed (ranging continue). The RS CDMA code #X for ranging (continue) may have been, for example, previously assigned by BS 610 to RS 612 as part of a group of RS CDMA codes, or dedicated RS CDMA codes, that were assigned to RS 612.

At 623, BS 610 receives the RS CDMA ranging code #X 622 (e.g., receives a message including RS CDMA ranging code #X) from RS 612. BS 610 recognizes or determines that code #X is assigned to RS 612 for a ranging (continue) procedure (e.g., based on a previous assignment of CDMA codes to RS 612). In general, the BS 610 may allocate bandwidth on one or more links based on the path (or network topology) and the procedure for the received CDMA code. In this example, BS 610 may know the path to MS 614, e.g., that the MS 614 (the MS performing the ranging) is coupled to BS 610 via two links, including the MS-RS link (the access link), and the RS-BS link. In this example, because the procedure is a ranging (continue) the BS 610 may allocate bandwidth in the DL (downlink) on the access link (the RS-MS link) for the RS 612 to transmit a Range response message (RNG-RSP) to the MS 614. Thus, in this case, BS 610 allocates bandwidth to RS 612 for a DL transmission via the RS-MS link for the RNG-RSP. The BS 610 may know or determine the network path or topology between the originating MS 614 and the BS 610 using a variety of different techniques. For example, the techniques described above with reference to FIGS. 1-5B may be used by BS 610 to determine a network path or topology, or other techniques may be used. If, for example, other RSs were located between MS 614 and BS 610 (along the network path here), then bandwidth may be allocated for transmissions over other links (either UL and/or DL bandwidth allocations on one or more links) as well, e.g., depending on the procedure and the network path.

Next, BS 610 transmits a bandwidth allocation message 624 including the CDMA code #X, and e.g., indicating the bandwidth allocation for the RS-MS link in the DL direction. The code #X being provided in a field of the bandwidth allocation message 624 allows the RS 612 to associate this bandwidth allocation message with the request transmitted via message 622 since it includes the same CDMA ranging code #X. The bandwidth allocation message 624 may be a message such as a MAP message (e.g., indicating reserved transmission times for uplink and downlink transmissions). The MAP message may include, for example, a CDMA Allocation Information Element (IE), indicating reserved bandwidth over the RS->MS link.

Next, the RS 612 may transmit a range response (RNG-RSP) 626 via the allocated bandwidth over the RS->MS link. This range response may, for example, inform the MS 614 to continue ranging, e.g., to adjust timing, transmission power, etc.

After receiving the RNG-RSP 626, the MS 614 then transmits a MS CDMA ranging code via a message 628. RS 612 receives message 628 and may determine that ranging is complete (e.g., timing and transmission power are within a tolerance or range). RS 612 then transmits a RS CDMA ranging code #Y (for a MS ranging complete procedure) via a message 630. This RS CDMA code #Y may identify or be associated with the RS 612 and may indicate the procedure being performed (Ranging complete). The RS CDMA code #Y, which may be a dedicated code, may therefore be for a same or similar or related procedure (ranging complete) as the received MS CDMA ranging code.

At 632, BS 610 receives the CDMA ranging code #Y, and determines or recognizes that code #Y is assigned or dedicated to RS 612 and is for a ranging complete procedure. BS 610 also may know or may determine the network path between MS 614 and BS 610 via RS 612 (or may at least determine a path between BS 610 and the originating RS 612). Based on the network path and the procedure, the BS 610 may allocate bandwidth on one or more links (either UL or DL allocations). In this example, because this is for a ranging complete procedure, the BS 610 may allocate bandwidth for: 1) RS 612 to transmit a RNG-RSP in DL direction to MS 614 via RS->MS link; 2) MS 614 to transmit Full RNG-REQ in UL direction to RS 612 via MS->RS link; and 3) RS 614 to transmit or forward the MS 614's Full RNG-REQ in UL direction to BS 610 via RS->BS link.

The BS 610 then transmits a bandwidth allocation message 634 including the RS CDMA code #Y and indicating bandwidth allocation for the three messages 1)-3) noted above, including indicating bandwidth allocation for RS->MS link in DL for RNG-RSP, and allocations for MS->RS link and RS->BS link for Full RNG-REQ.

Next, the RS 612 may transmit a bandwidth allocation message 636 to MS 614 including the MS CDMA ranging code, and an indication of allocated bandwidth on MS->RS link for Full RNG-REQ. RS 612 also transmits a RNG-RSP via message 638 on the allocated bandwidth via the RS->MS link.

The MS 614 then transmits a Full RNG-REQ 640 to RS 612 using the allocated bandwidth on the MS->RS link (e.g., no CDMA codes typically included with this message). The RS 612 then forwards the Full RNG-REQ via message 642 to BS 610 using the allocated bandwidth on the RS->BS link.

Figure 7:
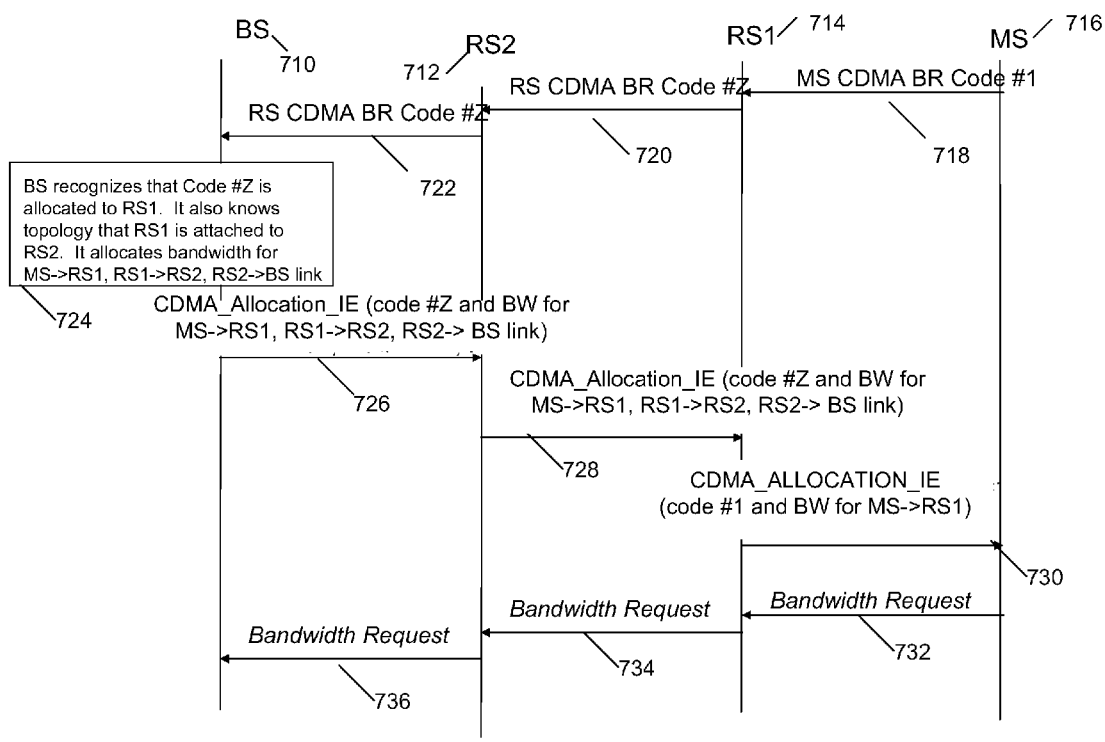
FIG. 7 is a diagram illustrating operation of a wireless network according to another example embodiment.

FIG. 7 is a diagram illustrating operation of a wireless network according to another example embodiment. The example of FIG. 7 illustrates allocation of bandwidth for a bandwidth request where there are two relay stations. The network 700 may include a base station (BS) 710, a relay station (RS2) 712, a relay station (RS1) 714 and a mobile station (MS) 716, although this is merely an example and any number of relay stations and/or mobile stations may be provided.

In this example, the MS 716 would like to send a bandwidth request, e.g., to request bandwidth allocation for a data transmission. The MS 716 may select and then transmit a MS CDMA code for bandwidth request, shown as code #1, via a message 718 to RS1 714. RS1 714 receives the message 718 and determines that the MS CDMA BR code #1 is for bandwidth request (BR). Therefore, RS1 714 transmits a RS CDMA BR code #Z to RS2 712 via message 720. RS CDMA BR code #Z is a CDMA code assigned or dedicated to RS1 714 for the procedure of bandwidth request, e.g., for data transmission. Thus, in this example, the procedure for RS CDMA code #Z is the same as (or similar to) the procedure for MS CDMA code #1 (bandwidth request), e.g., both the MS code #1 and the RS code #Z may correspond to a same or similar or related procedure.

RS2 712 receives the message 720, and then forwards the RS CDMA BR code #Z to BS 710 via message 722, as this code is for a bandwidth request directed to BS 710.

At 724, BS 710 determines that code #Z is assigned for RS1 714 (the originating RS) and is for a bandwidth request. BS 710 also knows or can determine the network or topology or network path between BS 710 and MS 716, e.g., that MS 716 is coupled to BS 710 via RS2 and RS1. BS 710 then allocates bandwidth for one or more links, e.g., based on the procedure of the received CDMA code and the network topology or path. In this example, BS 710 allocates bandwidth for a bandwidth request for the MS->RS1 link, RS1->RS2 link, and RS2->BS link. BS 710 then transmits a bandwidth allocation message 726 to RS2 that includes RS CDMA code #Z, and an indication of bandwidth allocation for transmissions over MS->RS1 link, RS1 ->RS2 link, and RS2->BS link.

RS2 712 receives the bandwidth allocation message 726. RS2 712 then forwards the bandwidth allocation message 728, which may include the CDMA code #Z and an indication of bandwidth allocation for transmissions over MS->RS1 link, RS1 ->RS2 link, and RS2->BS link, for example. According to an example embodiment, RS2 712 may forward the bandwidth allocation message 728, which may include the CDMA code #Z and an indication of bandwidth allocation for transmissions over MS->RS1 link and RS1 ->RS2 link, as there may be no need to forward the indication of bandwidth allocation for transmissions over RS2->BS link beyond the RS2 712.

RS1 714 then transmits a bandwidth allocation message 730 to MS 716, including the MS CDMA code #1, and an indication of bandwidth allocated for MS 716 for MS->RS1 link.

MS 716 then transmits its bandwidth request via message 732 to RS1 714 via the allocated bandwidth on the MS->RS1 link. RS1 714 then forwards the MS bandwidth request as message 734 to RS2 712 via the allocated bandwidth on the RS1->RS2 link. RS2 712 then forwards the MS bandwidth request as message 736 to the BS 710 via the allocated bandwidth on the RS2->BS link.

For example, in response to receiving a MS CDMA code #1 from a MS, the originating RS (or RS closest to or attached to a MS, such as RS1 714 in this example) may transmit or send a RS CDMA code that is assigned to the originating RS 714 (e.g., code #Z) upstream to a second RS (such as RS2 712 in this example of FIG. 7). The upstream relay stations (including RS2, 712, and others not shown in FIG. 7) may simply forward the RS CDMA code #Z assigned to the originating RS 714 up to the BS, where the BS 710 may allocate bandwidth or resources on one or more links and for either UL and/or DL transmissions over these links, e.g., based on the procedure and the topology or network path between the MS 716 and the BS 710. The code #Z assigned to the originating relay station (714) sent by the relay station 714, 712, may be for the same or a similar procedure as the received MS CDMA code #1 received from the MS 716. Although only two relay stations are shown in FIG. 7 (e.g., RSs 714, 712) there may be any number of relay stations (e.g., 1, 2, 3, 4, 5, 6, . . .) between the MS and the BS, and any number of links for which bandwidth may be allocated by BS 710.

Figure 8:
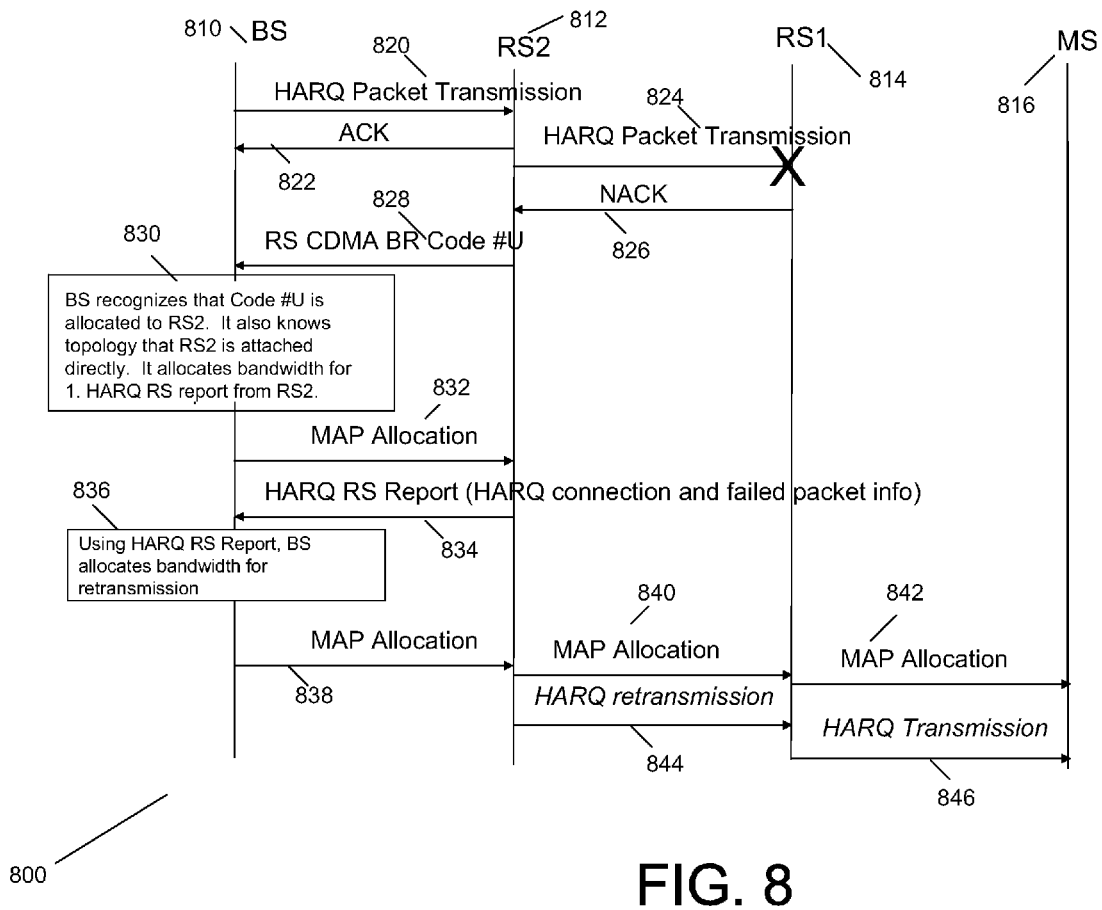
FIG. 8 is a diagram illustrating operation of a wireless network according to another example embodiment.

FIG. 8 is a diagram illustrating operation of a wireless network according to another example embodiment. The example of FIG. 8 illustrates allocation of bandwidth for a bandwidth request where there are two relay stations. The network 800 may include a base station (BS) 810, a relay station (RS2) 812, a relay station (RS1) 814 and a mobile station (MS) 816, although this is merely an example and any number of relay stations and/or mobile stations may be provided.

At 820, a Hybrid ARQ (hybrid automatic repeat request) or HARQ packet or message is transmitted by the BS 810 to RS2 812. RS2 812 forwards the HARQ message at 824, but the HARQ message is not correctly received by RS1, e.g., received packet is detected as corrupted at RS1. Therefore, RS1 814 sends a negative acknowledgement or NACK 826 back to RS2 812. Based on this NACK, RS2 812 realizes that it will need to retransmit the HARQ message or packet, and therefore sends a RS CDMA BR code #U, which is a CDMA code assigned to RS2 for HARQ failure, for example (e.g., to request bandwidth for such HARQ retransmission over RS2->RS1 link, and forwarding the HARQ message to MS 816 over RS1 ->MS link).

At 830, the BS 810 receives the RS CDMA BR code #U, and determines that code #U is assigned to RS2 812, and for HARQ. BS 810 also knows or can determine the network topology or network path back to MS 816 (e.g., that path back to RS1 814 includes BS-RS2 link, and a RS2-RS1 link). BS 810 then allocates bandwidth to allow RS2 812 to transmit to BS 810 a HARQ RS report from RS2 812 regarding the HARQ connection and failed HARQ transmission. At 832, BS 810 sends a bandwidth allocation message, such as a MAP message, indicating that bandwidth has been allocated for RS2 812 to transmit HARQ RS report to BS 810. At 834, RS2 812 then transmits the HARQ RS report via the allocated bandwidth over the RS2->BS link.

At 836, based on the HARQ RS report and the network topology, the BS 810 allocates bandwidth for the HARQ retransmission, including allocating bandwidth for the HARQ retransmission over the RS2->RS1 link and over the RS1 ->MS link. The bandwidth allocation message, indicating this allocated bandwidth for HARQ retransmission over these two links, is transmitted from BS 810 to MS 816 via messages 838, 840 and 842. Based on this allocated bandwidth for these two links (in the DL direction), the RS2 812 then retransmits the HARQ message or packet to RS1 814 at 844, which is then forwarded by RS1 814 to MS 816 at 846.

Figure 9:
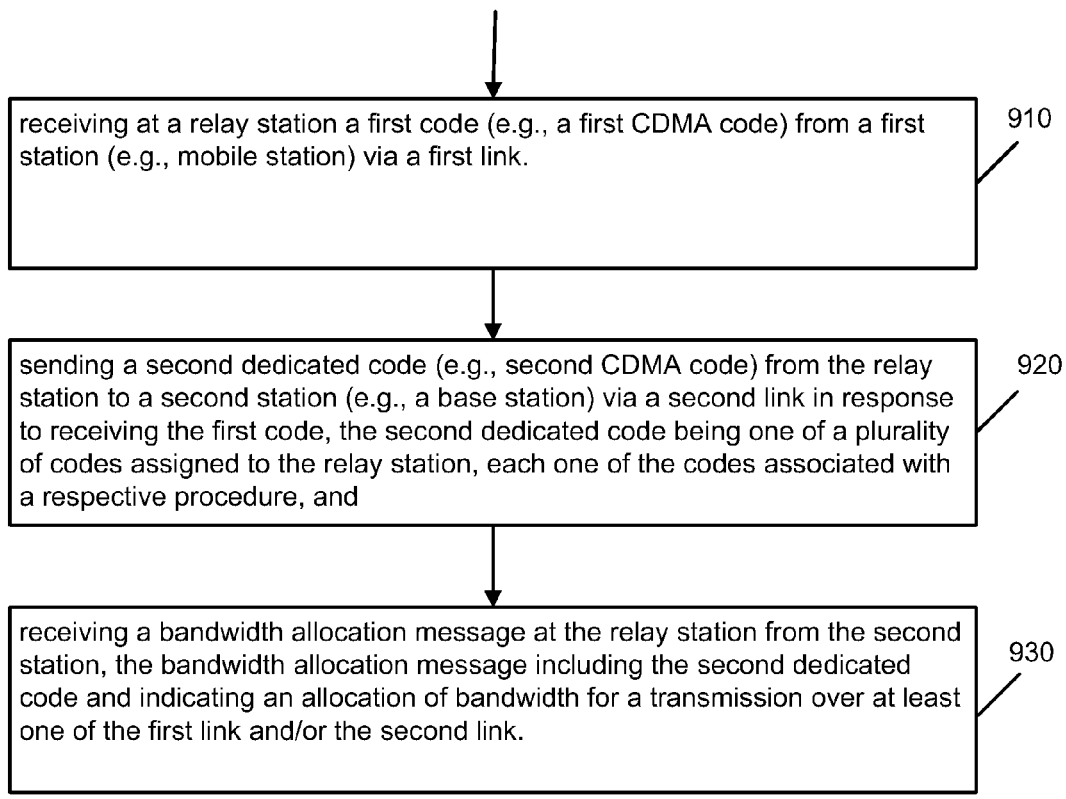
FIG. 9 is a flow chart illustrating operation at a wireless node such as a relay station according to an example embodiment.

FIG. 9 is a flow chart illustrating operation at a wireless node such as a relay station according to an example embodiment. At 910, a first code (e.g., a first CDMA code) is received at a relay station from a first station (e.g., a mobile station) via a first link.

At 920, a second dedicated code (e.g., a second CDMA code) is sent from the relay station to a second station (such as a base station, for example) via a second link in response to receiving the first code. The second dedicated code may be one of a plurality of codes assigned to the relay station, each one of the codes associated with a respective procedure.

At 930, a bandwidth allocation message may be received at the relay station from the second station. The bandwidth allocation message may include the second dedicated code and indicate an allocation of bandwidth for transmission over at least one of the first link and/or second link.

Figure 10:
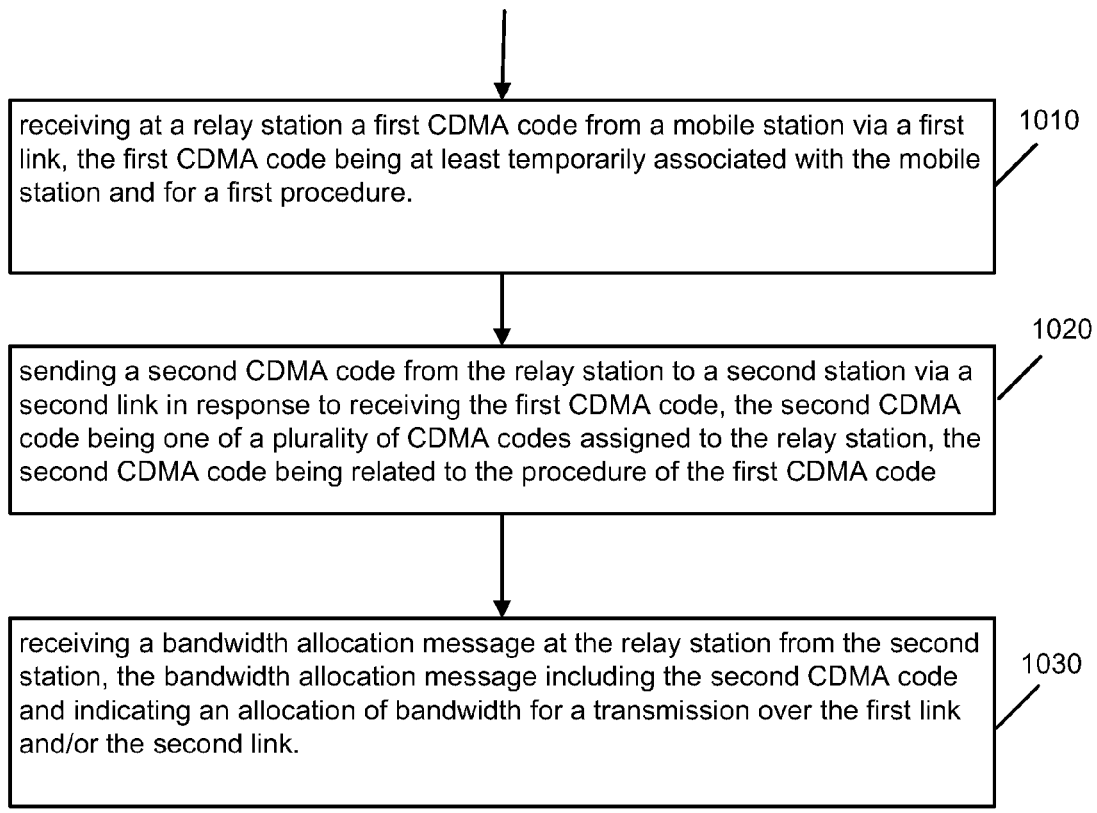
FIG. 10 is a flow chart illustrating operation at a wireless node such as a relay station according to another example embodiment.

FIG. 10 is a flow chart illustrating operation at a wireless node such as a relay station according to another example embodiment. At 1010, a first CDMA code is received at a relay station from a mobile station via a first link. The first CDMA code may be at least temporarily associated with the mobile station and for a first procedure.

At 1020, a second CDMA code is sent from the relay station to a second station via a second link in response to receiving the first CDMA code. The second CDMA code may be one of a plurality of CDMA codes assigned to the relay station, the second CDMA code also may be related to (e.g., same as or similar to) the procedure of the first CDMA code.

At 1030, a bandwidth allocation message is received at the relay station from the second station. The bandwidth allocation message may include the second CDMA code and may indicate an allocation of bandwidth for a transmission over the first link and/or the second link. For example, the bandwidth allocation message may be received from a base station, or provided by a base station via another relay station to the relay station.

Figure 11:
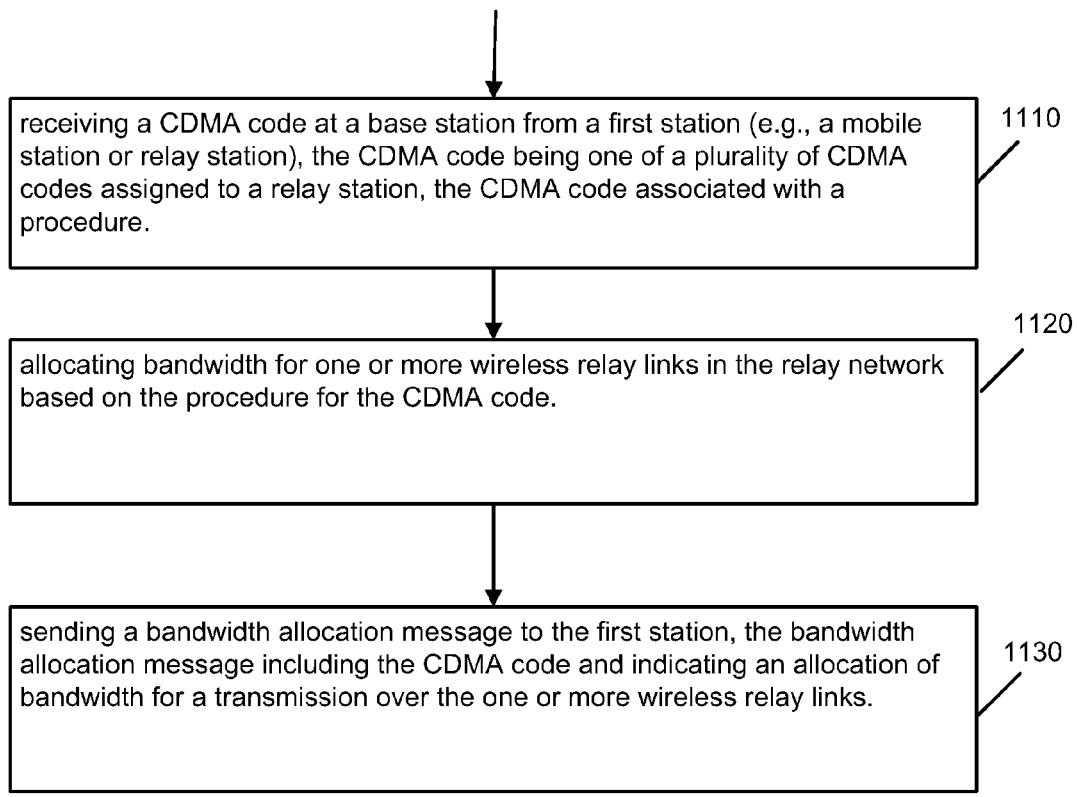
FIG. 11 is a flow chart illustrating operation at a wireless node such as a base station or AP according to yet another example embodiment.

FIG. 11 is a flow chart illustrating operation at a wireless node such as a base station or AP according to yet another example embodiment. At 1110, a CDMA code is received at a base station from a first station (e.g., a mobile station or relay station). The CDMA code may be one of a plurality of CDMA codes assigned to a relay station (e.g., an originating RS in a network path). The CDMA code may also be associated with (or for) a procedure.

At 1120, bandwidth is allocated for one or more wireless relay links in the relay network based on the procedure for the CDMA code.

At 1130, a bandwidth allocation message is sent to the first station. The bandwidth allocation message may include the CDMA code and may indicate an allocation of bandwidth for a transmission over one or more of the wireless relay links.

Figure 12:
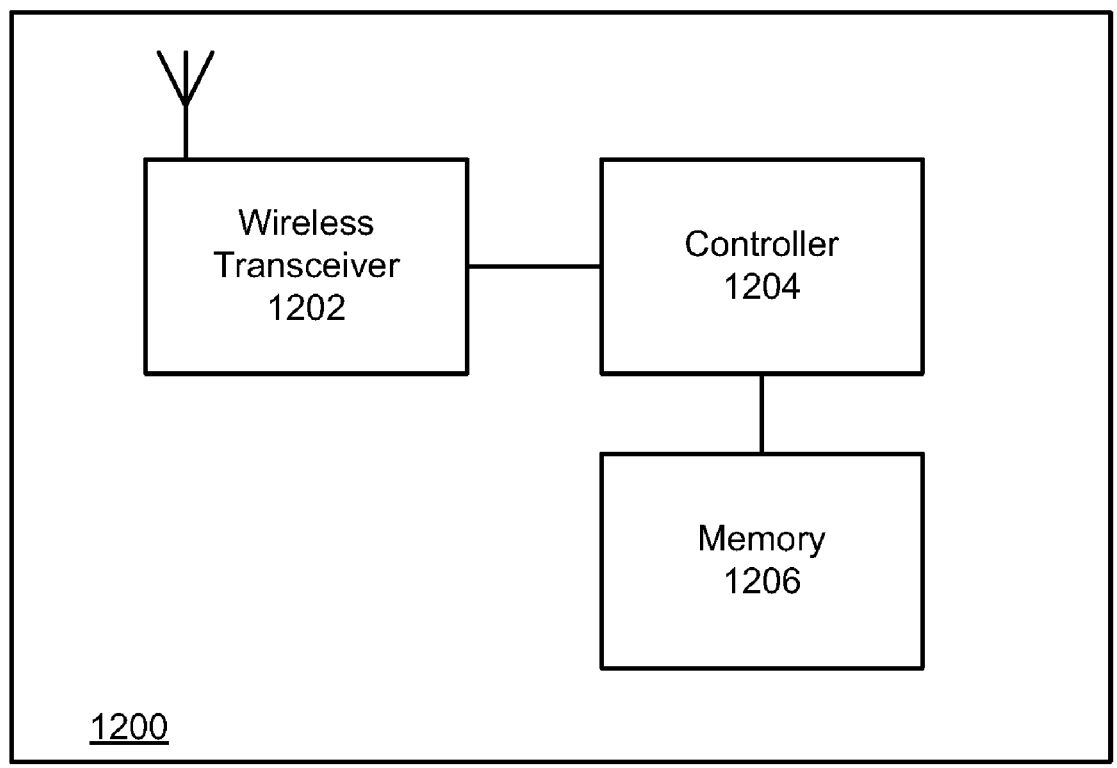
FIG. 12 is a block diagram illustrating an apparatus that may be provided in a wireless node according to an example embodiment.

FIG. 12 is a block diagram illustrating an apparatus 1200 that may be provided in a wireless node according to an example embodiment. The wireless node (e.g. station or AP) may include, for example, a wireless transceiver 1202 to transmit and receive signals, a controller 1204 to control operation of the station and execute instructions or software, and a memory 1206 to store data and/or instructions.

Controller 1204 may be programmable and capable of executing software or other instructions stored in memory or on other computer media to perform the various tasks and functions described above, such as one or more the tasks or methods described above in FIGS. 1-11.

In addition, a storage medium may be provided that includes stored instructions, when executed by a controller or processor that may result in the controller 1204, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method of allocating bandwidth in a relay network, the method comprising:
receiving at a relay station a first code from a first station via a first link;
sending a second dedicated code from the relay station to a second station via a second link in response to receiving the first code, the second dedicated code being one of a plurality of codes assigned to the relay station, each one of the codes associated with a respective procedure; and
receiving a bandwidth allocation message at the relay station from the second station, the bandwidth allocation message including the second dedicated code and allocating bandwidth for a transmission over at least one of the first link or the second link, wherein the bandwidth is allocated based on at least one or more of the respective procedures.

2. The method of claim 1 wherein the first code includes a first Code Division Multiple Access (CDMA) code for a first procedure, the first CDMA code at least temporarily associated with the first station, and wherein the second dedicated code includes a second CDMA code for or related to the first procedure, the second CDMA code assigned to or associated with the relay station.

3. The method of claim 1 wherein the receiving at a relay station a first code comprises receiving at the relay station a first CDMA code from a mobile station, the first CDMA code being associated with a procedure and at least temporarily associated with the mobile station.

4. The method of claim 3 wherein the receiving at a relay station a first code comprises receiving at the relay station from the mobile station the first CDMA code relating to a bandwidth request associated with one of a plurality of procedures.

5. The method of claim 1 wherein the sending comprises sending the second dedicated code from the relay station to a second relay station via the second link in response to receiving the first code.

6. The method of claim 1 wherein the sending comprises sending the second dedicated code from the relay station to a base station via the second link in response to receiving the first code, the second dedicated code being one of a plurality of CDMA codes assigned to the relay station.

7. The method of claim 1 wherein:
the second link includes a plurality of links across a plurality of relay stations included in the relay network, and
a base station determines a bandwidth allocation associated with a group of the plurality of links located on a path between the sending relay station and the base station based on one or more of a network topology determined by the base station, or a network topology determined based on a network location of the sending relay station, determined based on a receipt of the second dedicated code.

8. The method of claim 1 wherein the sending comprises sending a second CDMA code from the relay station to the second station in response to receiving the first code, the second dedicated code being one of a plurality of codes assigned to the relay station, the second dedicated code being one of the following:

a CDMA code for mobile station ranging continue;
a CDMA code for mobile station ranging complete;
a CDMA code for a mobile station bandwidth request for data transmission;
a CDMA code for a Hybrid ARQ (hybrid automatic repeat request) retransmission;
a CDMA code for a data or signaling transmission to a relay station; or
a CDMA code for a data or signaling transmission to a mobile station.

9. The method of claim 1 wherein the receiving the bandwidth allocation message comprises receiving a bandwidth allocation message at the relay station from the second station, the bandwidth allocation message including the second dedicated code and allocating bandwidth for a transmission over at least one of the first link or the second link, the second code including a second CDMA code.

10. The method of claim 1 wherein the receiving a bandwidth allocation message comprises receiving a Map message that indicates a bandwidth allocation for a transmission on the first link and/or the second link.

11. The method of claim 1 and further comprising:
forwarding the bandwidth allocation message from the relay station to the first station, the forwarded bandwidth allocation message including the first code; and
receiving at the relay station a message from the first station via the allocated bandwidth over the first link.

12. The method of claim 1 and further comprising:
forwarding the bandwidth allocation message from the relay station to the first station, the forwarded bandwidth allocation message including the first code;
receiving at the relay station a first message from the first station via the allocated bandwidth over the first link; and
transmitting from the relay station to the second station a second message via the allocated bandwidth over the second link.

13. The method of claim 1 and further comprising:
sending a message from the relay station to the first station via the allocated bandwidth over the first link.

14. A method comprising:
receiving at a relay station a first Code Division Multiple Access (CDMA) code from a mobile station via a first link, the first CDMA code being at least temporarily associated with the mobile station and for a first procedure;
sending a second CDMA code from the relay station to a second station via a second link in response to receiving the first CDMA code, the second CDMA code being one of a plurality of CDMA codes assigned to the relay station, the second CDMA code being related to the first procedure of the first CDMA code; and
receiving a bandwidth allocation message at the relay station from the second station, the bandwidth allocation message including the second CDMA code and indicating an allocation of bandwidth for a transmission over the first link and the second link, wherein the bandwidth is allocated based on at least the first procedure.

15. An apparatus for wireless communications, the apparatus comprising:
a controller;
a memory coupled to the controller; and
a wireless transceiver coupled to the controller;
the apparatus configured to:
receive at a relay station a first code from a first station via a first link;

send a second code from the relay station to a second station via a second link in response to receiving the first code, the second code being one of a plurality of codes assigned to the relay station, one or more of the codes associated with a respective procedure; and receive a bandwidth allocation message at the relay station from the second station, the bandwidth allocation message including the second code and allocating bandwidth for a transmission over at least one of the first link or the second link, wherein the bandwidth is allocated based on at least one or more of the respective procedures.

16. An apparatus for wireless communications, the apparatus comprising:
a controller;
a memory coupled to the controller; and
a wireless transceiver coupled to the controller;
the apparatus configured to:
receive at a relay station a first Code Division Multiple Access (CDMA) code from a mobile station via a first link, the first CDMA code being at least temporarily associated with the mobile station and for a first procedure;
send a second CDMA code from the relay station to a second station via a second link in response to receiving the first CDMA code, the second CDMA code being one of a plurality of CDMA codes assigned to the relay station, the second CDMA code being related to the first procedure of the first CDMA code; and
receive a bandwidth allocation message at the relay station from the second station, the bandwidth allocation message including the second CDMA code and indicating an allocation of bandwidth for a transmission over the first link and the second link, wherein the bandwidth is allocated based on at least the first procedure.

17. A method of allocating bandwidth in a relay network, the method comprising:
receiving a Code Division Multiple Access (CDMA) code at a base station from a relay station, the CDMA code being one of a plurality of CDMA codes assigned to the relay station, the CDMA code associated with a procedure;
allocating bandwidth for one or more wireless relay links in the relay network based on the procedure for the CDMA code; and
sending a bandwidth allocation message to the relay station, the bandwidth allocation message including the CDMA code and indicating an allocation of bandwidth for a transmission over the one or more wireless relay links.

18. The method of claim 17 wherein the CDMA code includes one of a plurality of CDMA codes included in a pool of CDMA codes allocated to mobile stations included in the relay network.

19. The method of claim 17 wherein the CDMA code includes one of a plurality of CDMA codes included in a first pool of CDMA codes different from a second pool of CDMA codes allocated to mobile stations included in the relay network.

20. The method of claim 17 wherein the receiving comprises receiving a CDMA code at a base station from the relay station via a first one of the wireless relay links, the CDMA code being assigned to the relay station, the CDMA code associated with a request for bandwidth for ranging response or data transmission on a second one of the wireless relay links.

21. The method of claim 17 wherein the receiving comprises receiving a CDMA code at a base station from the relay station, the CDMA code being assigned to the relay station, the CDMA code associated with a request for bandwidth for ranging response transmission on a first one of the wireless relay links for a relay station.

22. The method of claim 17 wherein the receiving comprises receiving a CDMA code at a base station from the relay station, the CDMA code being assigned to the relay station, the CDMA code associated with a request for bandwidth for ranging response transmission on a first one of the wireless relay links for a mobile station.

23. The method of claim 17 wherein the receiving comprises receiving a CDMA code at a base station from the relay station, the CDMA code being assigned to the relay station, the CDMA code associated with a request for bandwidth for transmitting a Hybrid Automatic Repeat request (HARQ) error report.

24. An apparatus for wireless communications, the apparatus comprising:
a controller;
a memory coupled to the controller; and
a wireless transceiver coupled to the controller;
the apparatus adapted to:
receive a Code Division Multiple Access (CDMA) code at a base station from a relay station, the CDMA code being one of a plurality of CDMA codes assigned to the relay station, the CDMA code associated with a procedure;
allocate bandwidth for one or more wireless relay links in the relay network based on the procedure for the CDMA code; and
send a bandwidth allocation message to the relay station, the bandwidth allocation message including the CDMA code and indicating an allocation of bandwidth for a transmission over the one or more wireless relay links.

* * * * *